G. F. MANN.
DRAFT MECHANISM FOR VEHICLES.
APPLICATION FILED FEB. 1, 1908.
1,089,847.
Patented Mar. 10, 1914.
3 SHEETS—SHEET 2.
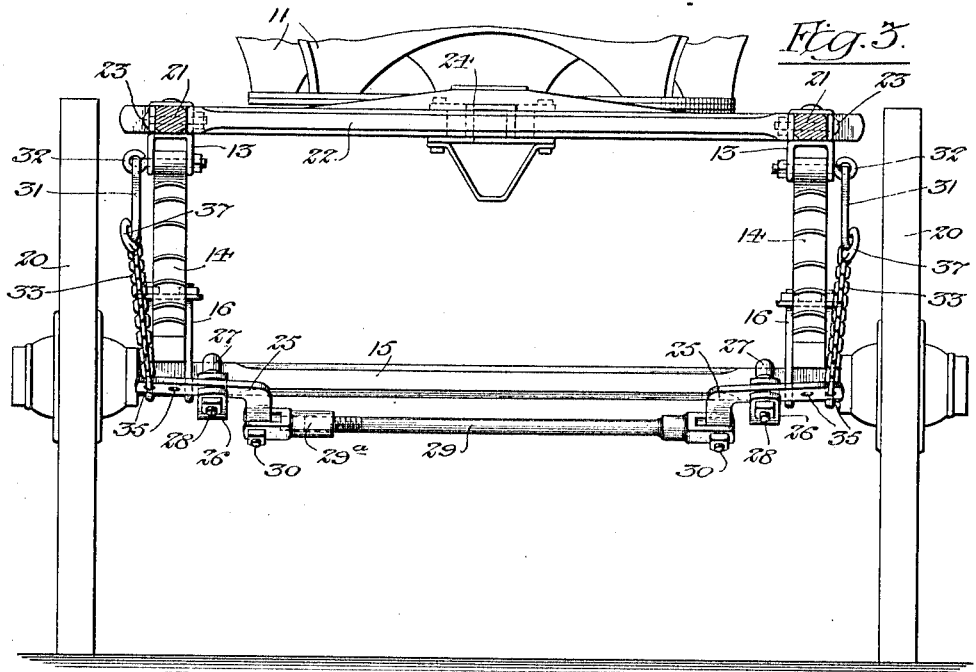
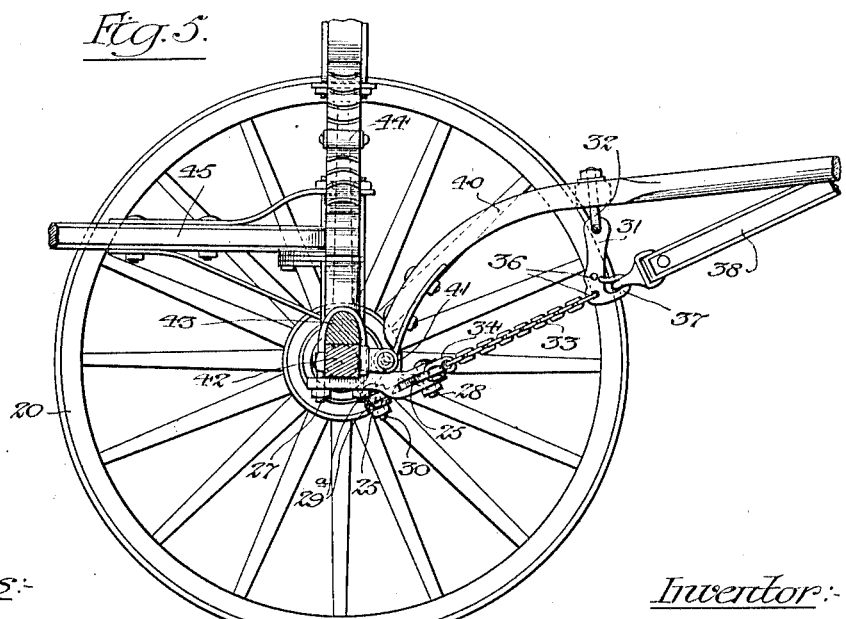

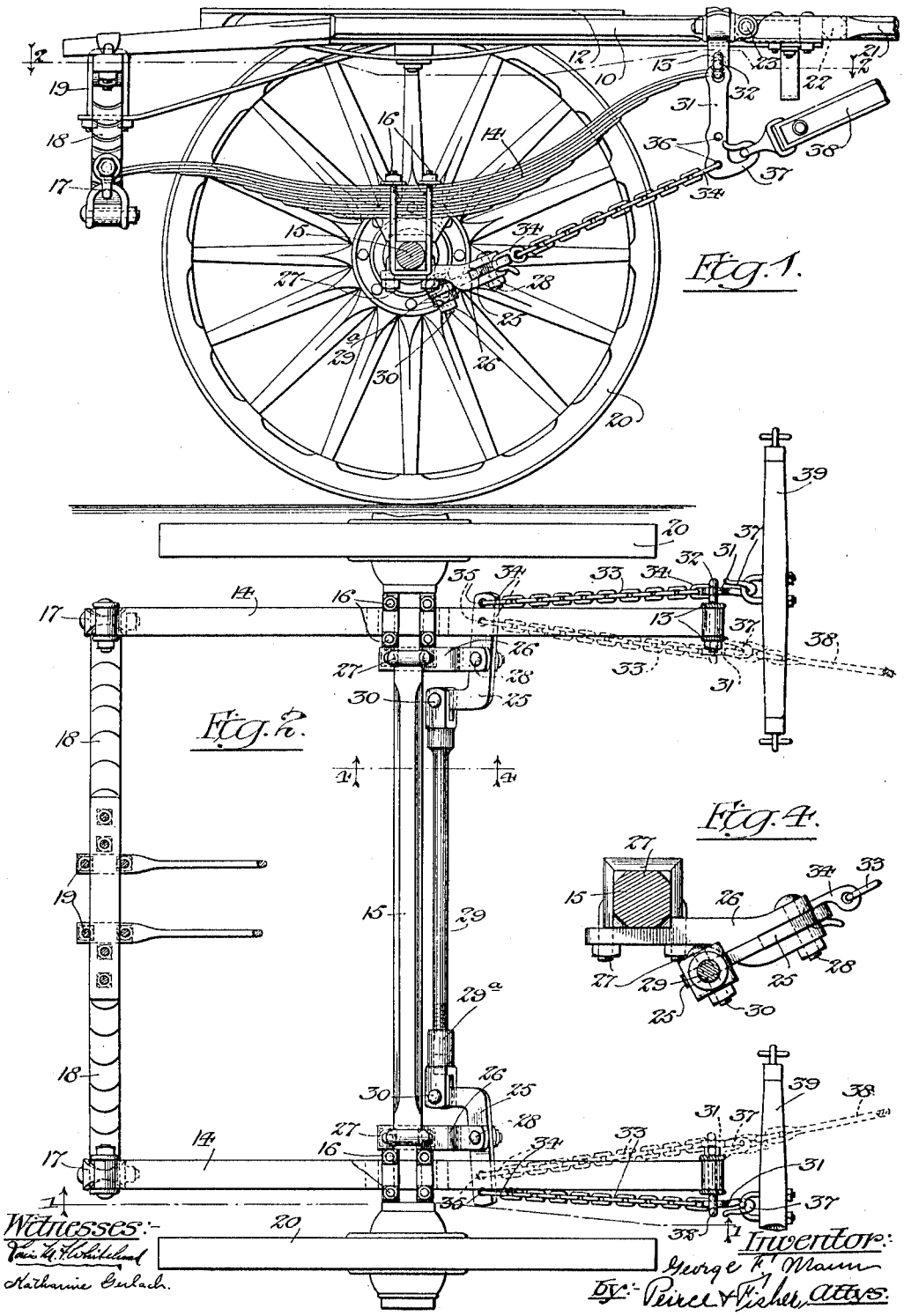

G. F. MANN.
DRAFT MECHANISM FOR VEHICLES.
APPLICATION FILED FEB. 1, 1908.
1,089,847.
Patented Mar. 10, 1914.
3 SHEETS—SHEET 3.
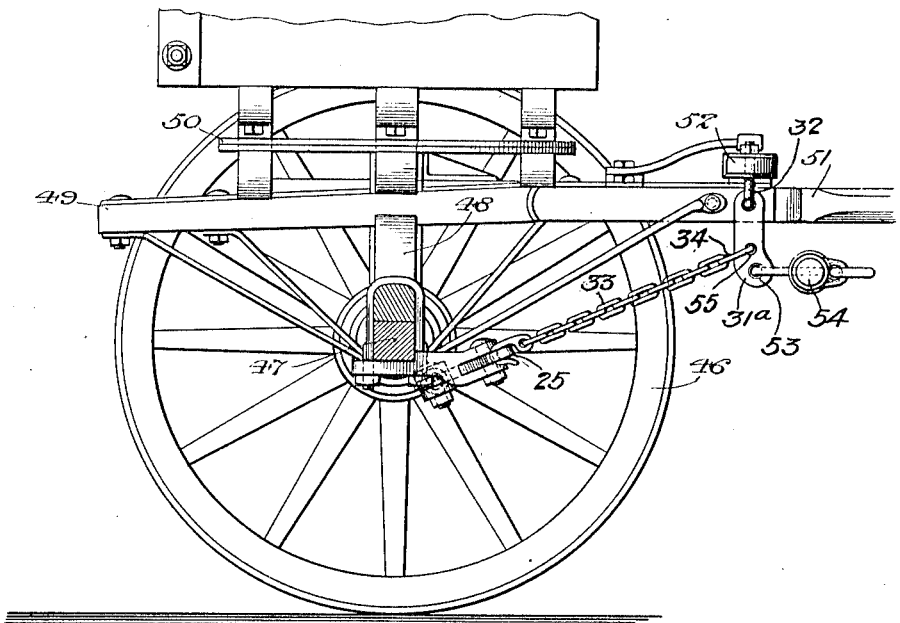
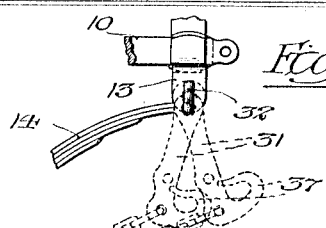
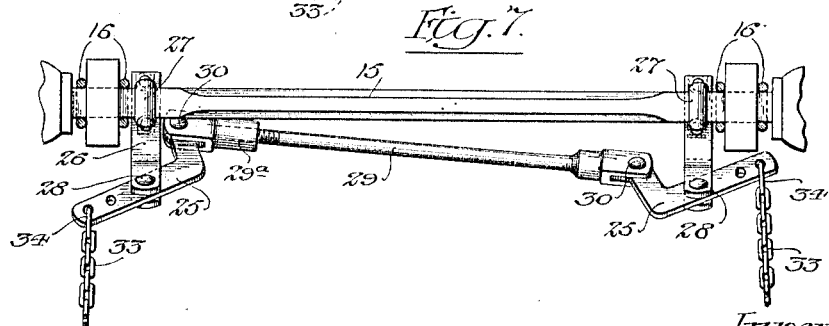

UNITED STATES PATENT OFFICE.

GEORGE F. MANN, OF CHICAGO, ILLINOIS.

DRAFT MECHANISM FOR VEHICLES.

1,089,847. Specification of Letters Patent. Patented Mar. 10, 1914.

Application filed February 1, 1908. Serial No. 413,814.

*To all whom it may concern:*

Be it known that I, GEORGE F. MANN, a citizen of the United States, and a resident of Chicago, county of Cook, and State of Illinois, have invented certain Improvements in Draft Mechanism for Vehicles, of which the following is a specification.

The invention relates to draft mechanism for vehicles, and seeks to provide simple and effective means by which the draft, either of a single horse or of a team of horses, may be applied directly to the front wheel axle of the vehicle, together with suitable means for equalizing the pull across the front wheel axle.

The invention consists in the features of construction, combinations and arrangements of parts hereinafter set forth, illustrated in the accompanying drawings and more particularly pointed out in the appended claims.

In the drawings, Figure 1 is a view in elevation of the front truck of a vehicle to which the present improvement is applied. The rear wheel is omitted from the figure for the sake of clearness and the front wheel axle is shown in section on the line 1—1 of Fig. 2. Fig. 2 is a plan view of the arrangement shown in Fig. 1 with parts shown in section on the line 2—2 of Fig. 1. Fig. 3 is a front elevation of the parts shown in Figs. 1 and 2. Fig. 4 is a detail section on the line 4—4 of Fig. 2. Fig. 5 is a view similar to Fig. 1 illustrating the application of the invention to a different type of vehicle. Fig. 6 is a view similar to Figs. 1 and 5 illustrating the application of the invention to still another type of vehicle. Fig. 7 is a detail plan view of the improved draft mechanism shown in changed position. Fig. 8 is a detail view of a portion of the improved draft mechanism illustrating the same in different positions.

The improved draft mechanism may be applied to different forms of vehicles. In Figs. 1 to 3 inclusive it is shown applied to the front truck of a vehicle that comprises the frame bars 10 to which the front bolster 11 is pivotally connected. A fifth wheel 12 is interposed between the frame members 10 and the bolster 11. At their forward ends the frame members 10 of the truck are connected by brackets 13 to the forward ends of the side springs 14. These side springs rest upon the ends of the front wheel axle 15 and are securely connected thereto by the U-bolts 16. The rear ends of the side springs 14 are connected by the coupling devices 17 to the end of a transverse spring 18 that is centrally connected by the U-bolts 19 to the rear of the frame members 10 of the truck. The wheels 20 are journaled upon the ends of the axle 15. Shafts 21 for a single horse are connected together at their rear ends by a cross-bar 22 and are connected to the front ends of the frame bars 10 of the truck by suitable couplings 23. If a team of horses is to be employed the shafts 21 may be disconnected from the truck and a pole inserted in a suitable bracket 24 provided on the truck for that purpose. The construction described is a well-known form of truck and need not be more fully set forth here.

The improved draft mechanism comprises draft members which are connected directly to the wheel axle so as to apply the pull of a single horse or of a team of horses directly to the wheel axle and independently of the tongue or shafts thereof. These draft members preferably comprise a pair of levers or bell-cranks 25 which are pivotally connected to the ends of the wheel axle, preferably by means of a pair of brackets 26 which are connected to the wheel axle 15 by U-bolts 27. One arm of each of the bell-cranks 25, in the form shown, is arranged in the forked front end of the corresponding bracket 26 and is connected thereto by the pivot bolt 28. The forward end of each bracket 26 is upwardly and forwardly inclined to a slight extent, as most clearly shown in Fig. 1, so that the bell-cranks or draft members 25 swing in a plane slightly inclined to the horizontal. The outwardly projecting arms of the bell-cranks swing in a fore and aft direction while the rearwardly projecting arms thereof swing in lateral direction. These latter arms are connected by equalizing means preferably in the form of a bar 29 having forked ends that embrace the rearwardly projecting arms of the bell-cranks and which are pivotally connected thereto by bolts 30. One end portion 29ª of the thrust bar is preferably adjustably screw-threaded upon the main portion thereof so that the length of the equalizing thrust bar may be varied as desired with vehicles of different width and so that the draft members 25 may be connected to the ends of the axle closely adjacent, the wheels 20 thereon.

The hitch devices are connected directly to the draft members and preferably to the outwardly projecting arms of the bell-cranks 25 so that the draft of the horse or horses is brought to bear with a straight line pull directly and effectively upon the wheel axle. The hitch devices are preferably in the form of links 31 which are provided, in the form shown, with openings or holes in their upper ends engaging the eyes of bolts 32 by which the hitch devices or links 31 are connected to the vehicle or vehicle truck at a point in front of and above the wheel axle 15. In the forms shown in Figs. 1 to 3 inclusive, the hitch devices or links 31 are connected by the eye-bolts 32 to the brackets 13 at the forward upper part of the truck. These bolts also serve, in the forms shown, to connect the brackets 13 to the forward ends of the side springs 14. The hitch devices or links 31 are thus free to swing in fore and aft direction and may also move laterally to some extent. The hitch devices are connected to the outwardly projecting arms of the draft members or bell-cranks 25 preferably by means of chains 33 having hooks 34 at their ends, and which are arranged to engage respectively one of a series of holes 35 in the arms of the bell-cranks 25 and one of a series of holes 36 in the lower ends of the hitch devices 31. The lower ends of the hitch devices 31, in the form shown, are also provided with hooks 37 to which the tugs or traces 38 may be directly connected when a single horse is employed. If two horses are employed swingletrees 39 are connected to the hooks 37 as indicated in full lines in Fig. 2. Where the swingletrees 39 are employed for two horses the bolts 32 are arranged in position with their eyes, which support the hitch devices or links 31, outside the brackets 13 and the hooks 34 at the rear ends of the connecting chains 33 engage the holes 35 in the outer ends of the bell-cranks or draft members 25, as shown in Fig. 3 and in full lines in Fig. 2. When a single horse is employed the eyes of the bolts 32 and the hitch devices or links 31 are arranged inside the brackets 13, and the connecting chains 33 are arranged in the position shown in dotted lines in Fig. 2. When arranged either for one or two horses the draft or pull is brought to bear through the chains 33 and draft members or bell-cranks 25 directly upon the wheel axle at the points adjacent the wheels thereon. At the same time the free swinging movement of the hitch devices 31 and the connection draft members 25 properly equalizes the pull or draft upon the opposite ends of the wheel axle. In Fig. 8 the extreme positions of the hitch device or links 31 are illustrated in dotted lines. In Fig. 7 the shifted position of the draft members 25 and the connecting equalizing bar 29 is illustrated.

In Fig. 5 the application of the invention to a light wagon or vehicle is illustrated. In this form the downturned rear ends of the shafts 40 are connected by suitable thill couplings 41 to the wheel axle 42 and bolster 43 thereon. The front end of the wagon rests upon a spring 44 that is connected to the forward end of a reach 45. The latter in turn is connected in the usual manner to the bolster 43 on the front wheel axle. The construction and arrangement of the draft mechanism is entirely similar to that previously set forth except that the eye-bolts 32 which uphold the hitch devices or links 31 are connected to the rear ends of the shafts 40.

In Fig. 6 the application of the invention to a heavy springless truck is illustrated. The wheels 46 are journaled upon the end of an axle 47 to which is secured a bolster 48 and the frame bars 49 of the truck. The forward end of the vehicle or wagon is connected in the usual manner to the trucks and rests upon a fifth wheel 50 carried thereby. A tongue 51 is secured to the frame bars of the truck and a cross-tree 52 is pivotally connected to the rear end of the tongue. The construction of the draft mechanism is entirely similar to that above set forth except that the eye-bolts 32 are connected to the ends of the cross-tree 52. The hitch devices 31ª are slightly different in form and are provided with openings 53 to which the swingletrees 54 are connected and with other openings 55 above the openings 53 which are engaged by the hooks 34 on the forward ends of the connecting chains 33. This arrangement of the hitch devices applies the pull of the team with increased leverage to the connecting chains 33 and to the draft members or bell-cranks 25 that are connected directly to the axle as before.

The improved draft mechanism may be readily applied to different forms of vehicles, will insure that the draft of the horse or team of horses will be brought to bear directly and in a straight line pull upon the ends of the front wheel axle of the vehicle and at points closely adjacent the wheels. In the construction usually employed the draft of the team is brought centrally to bear upon the forward truck and at points distant from the wheels. The improved draft mechanism has, for this reason, been found extremely efficient in practice as it is obviously desirable to apply the draft as directly to the wheel axle and wheels as possible. At the same time the draft at opposite ends of the axle is properly equalized.

It is obvious that numerous changes may be made in the details set forth without departure from the essentials of the invention as defined in the claims.

Having described my invention, what I claim as new and desire to secure by Letters Patent, is:—

1. In draft mechanism, the combination with a vehicle and a pivoted front axle thereof, of a pair of draft arms pivotally mounted upon the opposite ends of the pivoted front wheel axle to swing in planes inclined upwardly and forwardly and to apply the pull directly thereto independently of the vehicle tongue or shafts, an equalizing connection between said draft arms, and separate hitch devices mounted on the vehicle above and in front of said draft arms and connected thereto, said hitch devices being movable in fore and aft direction independently of the vehicle tongue or shafts, substantially as described.

2. In draft mechanism, the combination with a vehicle and the pivoted front wheel axle thereof, of a pair of brackets detachably clamped upon the opposite ends of said pivoted front wheel axle, a pair of draft arms pivoted to said brackets, an equalizing connection between said draft arms, and separate hitch devices pivotally movable in fore and aft direction connected respectively to said draft arms, substantially as described.

3. In draft mechanism, the combination with a vehicle and the pivoted front wheel axle therefor, of a pair of draft arms pivoted directly upon the opposite ends of said front wheel axle to swing in planes inclined to the horizontal, an equalizing connection between said draft arms, a pair of hitch devices independently connected to said vehicle in front of and above said wheel axle to swing in vertical planes and in fore and aft direction, and upwardly and forwardly inclined connections between said hitch devices and said draft arms, substantially as described.

GEORGE F. MANN.

Witnesses:
HARRY L. CLAPP,
KATHARINE GERLACH.

---

Copies of this patent may be obtained for five cents each, by addressing the "Commissioner of Patents, Washington, D. C."